PNEUMATIC RELAXATION OSCILLATOR

Filed Sept. 10, 1963 2 Sheets-Sheet 1

INVENTOR,
CHRIS E. SPYROPOULOS

BY Harry M. Saragovitz,
Edward J. Kelly,
Herbert Berl &
L. J. Marhoefer

PNEUMATIC RELAXATION OSCILLATOR

Filed Sept. 10, 1963 2 Sheets-Sheet 2

INVENTOR,
CHRIS E. SPYROPOULOS
BY Harry M. Saragovitz,
Edward J. Kelly,
Herbert Berl &
L. I. Marhoefer United States Patent Office 3,217,727

Patented Nov. 16, 1965

3,217,727

PNEUMATIC RELAXATION OSCILLATOR

Chris E. Spyropoulos, Washington, D.C., assignor to the United States of America as represented by the Secretary of the Army Filed Sept. 10, 1963, Ser. No. 308,038
4 Claims. (Cl. 137—81.5)
(Granted under Title 35, U.S. Code (1952), sec. 266)

The invention described herein may be manufactured and used by or for the Government of the United States of America for governmental purposes without the payment to me of any royalty thereon.

This invention relates to fluid amplifiers, and more particularly to a fluid relaxation oscillator.

With the discovery of the principles of pure fluid amplification, new vistas have been opened in the field of pneumatics. Pure fluid oscillators, involving both positive and negative feedback, have been disclosed. Examples of such oscillators may be found in the U.S. Patent No. 3,185,166 granted to Billy M. Horton and Romald E. Bowles, and also in the U.S. Patent No. 3,158,166 granted to Raymond W. Warren. These pure fluid oscillators, while highly satisfactory for many applications, such as computers, counters, timers, and the like, do not always operate satisfactorily into substantially blocked loads, such as would be presented by a piston, or the ventrical of a heart pump. In such applications, prior art oscillators will tend to switch on back loading, and give a low efficiency, short duration, spiked output.

One object of the present invention is to provide a novel, pure fluid oscillator utilizing relaxation principles.

Another object of this invention is to provide a fluid oscillator which exhibits good pressure recovery characteristics, and high efficiency, when working into substantially blocked loads.

Another object of this invention is to provide a fluid relaxation oscillator having a generally square wave characteristic output when operated into substantially blocked, high inertia, loads. In such applications, the designed output pressure of the oscillator can be maintained constant for a relatively long period in order to operate the load efficiently.

A further object of the invention is to provide a fluid relaxation oscillator wherein the frequency of oscillation is not radically effected by changes in load.

Still another object of the invention is to provide a novel fluid oscillator wherein the frequency of oscillation may be easily varied without destroying the output waveform of the oscillator.

These and other objects of the invention are accomplished by the use of a fluid relaxation oscillator. This novel oscillator combines a boundary layer control fluid amplifier and a pressure differential relaxation control means. The fluid amplifier has a receiving aperture system with two channels, a vent channel, and a load channel. The relaxation pressure differential control means is placed adjacent the load channel in close proximity to the power jet orifice, where a pressure differential across the power jet can cause switching of the power jet. This relaxation pressure differential control means operates to limit the rate of pressure increase on the load side of the power jet when the jet is in the load channel, thereby holding the power jet in the load channel for a predetermined time. Additionally, the pressure differential control means creates, at a predetermined controlled rate, a region of reduced pressure on the load side of the fluid jet when the jet is in the vent channel which switches the jet into the load channel when the pressure drops to a predetermined amount.

Amplifiers disclosing the general principle of boundary layer lock-on control are disclosed in the above-mentioned patents. Briefly, in a boundary layer controlled fluid amplifier, a high energy power jet is directed toward a target area or receiving aperture system by the pressure distribution in a power jet boundary layer region. This pressure distribution is controlled by the wall configuration of an interaction chamber, the power jet energy level, the fluid transport characteristics, the back-loading of the amplifier outputs, and the flow of control fluid to the power jet boundary layer region. In the boundary layer controlled fluid amplifier the interaction chamber configuration permits the power jet to lock-on to one side wall and remain in the lock-on flow configuration without control fluid flow. When the power jet is suitably deflected, it will then lock-on to the opposite side wall to remain in the lock-on configuration, again in the absence of control fluid flow.

One further general feature of the fluid amplifier used to practice this invention concerns the placement of the splitter, which separates the receiving channels and apertures. The splitter should be placed as close to the power jet orifice as practical in order to enhance the pressure recovery characteristics of the unit, and also minimize the memory effects of the amplifier, placing the switching action of the power jet under the control of the transverse pressure differential developed across the jet.

The specific nature of the invention, as well as other objects, uses and advantages thereof, will clearly appear from the description and from the accompanying drawing, in which.

Figures 1, 2:
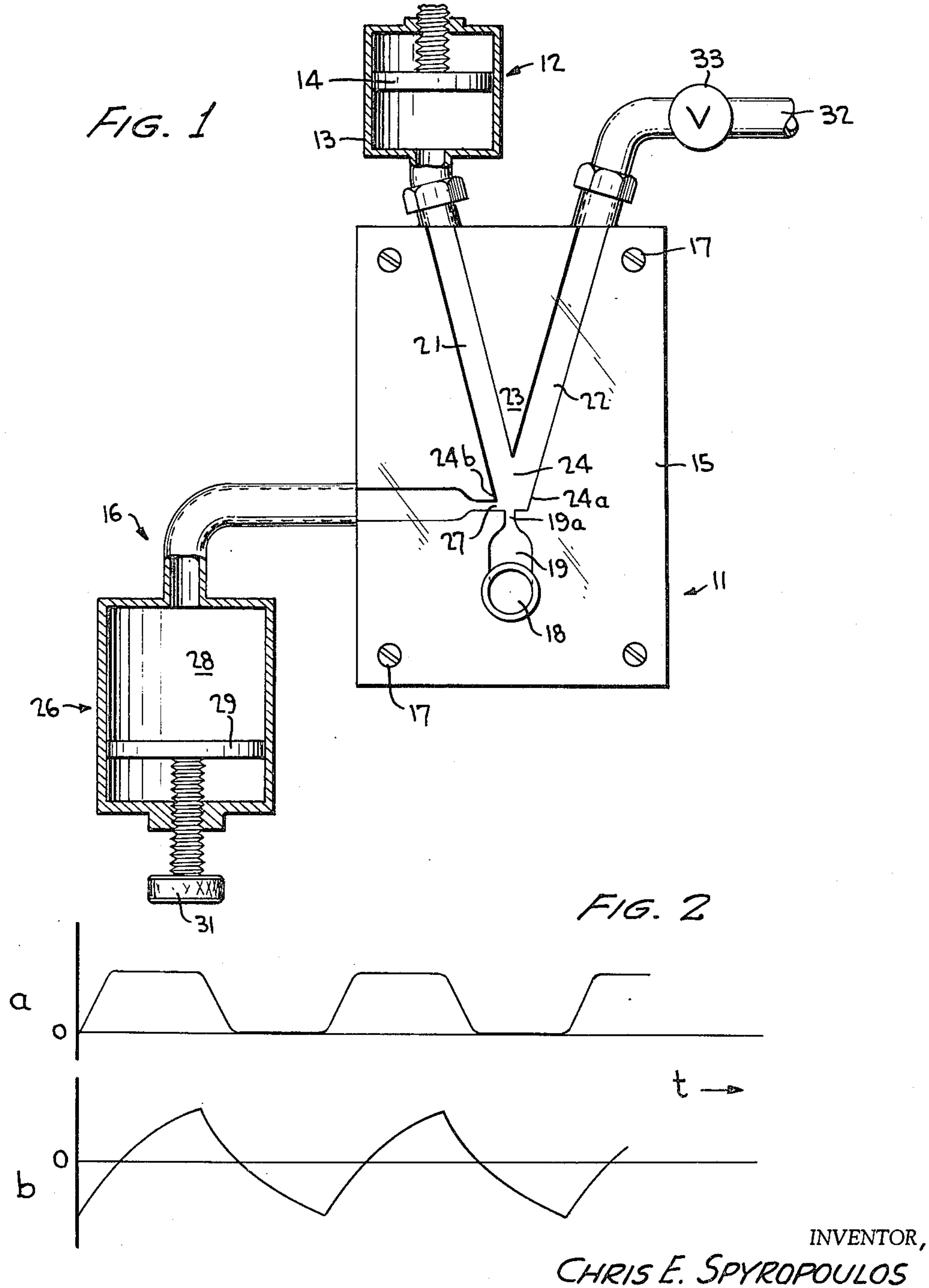
FIG. 1 is a plan view of one embodiment of a fluid oscillator constructed in accordance with the teachings of this invention.
FIG. 2 illustrates wave forms obtained from the oscillator of FIG. 1.

The embodiment of FIG. 1 shows a fluid relaxation oscillator 11 constructed in accordance with the teachings of this invention connected to an essentially blocked load 12. For the purpose of illustration, the load 12 is represented as a cylinder 13 with a piston 14. Obviously, the cylinder and piston combination is only representative of a whole class of devices which may be characterized as being an essentially blocked load. The relaxation oscillator itself consists of a boundary layer control amplifier 15, and a relaxation pressure differential control means 16.

The construction of the boundary layer control fluid amplifier 15 is well known in the art, and reference may be had to either of the aforementioned patents for details. Briefly, in its most common form, the amplifier 15 will be formed by two plates held together by machine screws 17. The channels, nozzles, etc., will be cut out of one plate, and the other plate will serve as a cover. The top plate here is shown as clear plastic for convenience. The operating fluid power supply is applied at 18, and the power jet is formed in the power jet nozzle 19. The power jet issues from the power jet nozzle orifice 19*a*, and is directed alternately into load channel 21, and the vent channel 22, by the control of relaxation pressure differential control means 16, as will be subsequently explained in greater detail. Separating the load channel 21 and the vent channel 22 is a splitter 23, which should be placed close to the power jet orifice 19*a*. This accomplishes two things. First, it increases the pressure recovery characteristics of the amplifier, and hence, provides efficient operation for the oscillator. Second, it minimizes the memory effect of the amplifier, and allows relaxation pressure differential control means 16 to control the switching action of the oscillator.

Between the splitter 23 and the power jet orifice 19*a*, there is an interaction region 24, having side walls 24*a* and 24*b*. The walls 24*a* and 24*b* of the interaction region 24 are set back from either edge of power jet orifice 19*a* a limited amount. Because the walls 24*a* and 24*b* are set back, when fluid issues from the nozzle 19, a region of fluid moving at a significantly lower speed than the main stream is created along these walls. This region, along either wall 24*a* or 24*b*, is known in the art as an "artificial boundary region," and is essentially a region of reduced pressure. The effect of this region is to cause the main fluid stream from the power nozzle 19 to bend towards, and "lock-on" to either the wall 24*a* or 24*b*. In this type amplifier, the power jet can be controlled by the pressure differential across the stream. Therefore, with the stream locked-on to one of the walls, an increase in pressure along the wall of sufficient magnitude will cause the stream to switch and lock-on the opposite wall. Alternately, reducing the pressure on the side of the stream away from the wall has, of course, the same effect; namely, to switch the stream to the opposite wall.

The relaxation differential pressure control means 16 controls the switching between the walls 24*b* and 24*a*. This relaxation differential pressure control means 16 consists essentially of a fluid capacitor 26 and a fluid resistance in the form of a laminar restriction 27. Laminar restriction 27 is formed by an orifice in the load output channel side of the interaction region 24, and is located in close proximity to the power jet orifice 19*a*. The fluid capacitance 26 may, in the case of a compressible fluid such as air, take the form of a fixed chamber such as chamber 28. The volume of chamber 28 may be varied by means of piston 29 and screw 31, if desired, in order to change the frequency of oscillation. If an incompressible fluid is used, fluid capacitance 26 may take the form of a chamber with a deformable diaphragm.

The operation of the relaxation oscillator 11 may be described with respect to FIG. 2*a*, which shows the pressure variation at the load 12 as a function of time, and FIG. 2*b* which shows the pressure variation at control orifice 27 as a function of the same time. Assume that at $t=0$, the power jet issuing from power jet nozzle 19 has just switched into load channel 21, and that the pressure at control orifice 27 is at some low value below ambient pressure, designated for convenience as 0. With the power jet directed into load channel 21, the pressure at the essentially block load 12 rises very rapidly, as shown in FIG. 2*a*. The rise time for the pressure build up at the load 12 is determined chiefly by the amount of distributed fluid capacitance associated with the load, and the amount of fluid resistance associated with the output channel 21. Since the amount of fluid capacitance associated with the normal load is not great, and also since the output channel 21 may be designed to have a low fluid resistance, the rise time for the pressure in the load can be made very short. When the point of maximum pressure recovery in the load for the amplifier 15 has been reached, the pressure stops increasing, and holds steady until the oscillator switches.

The increased pressure in the load 12 makes itself felt back along the output channel 21 and tends to raise the pressure along the wall 24*b* in the interaction region. However, due to the laminar restriction formed by the differential pressure control orifice 27, and the connected fluid capacitance 26, the time constant for the rise in pressure in relaxation differential pressure control unit 16 is considerably longer than that for the load 12. As shown in FIG. 2*b*, the pressure at pressure differential control orifice 27 continuously rises at a rate determined by the laminar restriction formed by orifice 27, and the size of the capacitance 26. When the pressure at 27 has exceeded a predetermined amount, the power jet switches from load channel 21 to vent channel 22. This switching is accompanied by a rapid decrease in the pressure at the load 12, as shown in FIG. 2*a*.

Vent channel 22 is opened to ambient pressure at 32, although some degree of tuning may be affected by valve 33. The power jet issuing from vent channel 22 entrains fluid from capacitor 26 through differential pressure control orifice 27. As shown in FIG. 2*b*, the pressure at control orifice 27 gradually decreases as more and more fluid is entrained. The rate of decrease is primarily controlled by the time constant associated with the fluid capacitance 26, and the laminar restriction formed by the control orifice 27. Entrainment from load channel 21 has a modifying effect on this rate of decrease. When a sufficiently low value of pressure at control orifice 27 has been reached, the pressure differential across the jet stream issuing from power jet orifice 19*a* is sufficient to detach the power jet from the wall 24*a*, and cause it to lock-on to the wall 24*b*. When the stream switches, a rapid increase of pressure is experienced in the load 12, the initial conditions are again present, and the cycle repeats.

The time constant of the relaxation differential pressure control is proportional to the size of the capacitor 26, and the size of the laminar restriction, or fluid resistance associated with it. The larger the capacitance and the smaller the laminar restriction, the larger the time constant. Of course, it is not necessary that the pressure differential control orifice 27 be the only laminar restriction associated with capacitance 26. Additional fluid resistance may be inserted in the line between the orifice 27 and capacitance 26 if desired. In any event, since the amount of fluid resistance associated with capacitance 26 is normally fixed, the most expeditious way to vary the time constant of the relaxation differential pressure control unit 16 is to vary the amount of capacitance.

Varying the time constant of the control unit 16 will, of course, vary the frequency of oscillations, as may be seen from an inspection of FIG. 2. The capacitance 26 can be easily varied by means of the piston 29 and a screw 31.

The amount of back pressure in vent channel 22 may be controlled by means of valve 33. This controls the pressure along the wall 24*a*, and consequently the pressure at which the power stream will switch from the vent channel 22 into the load channel 21, thereby allowing the valve 33 to be used for tuning of the oscillator.

Figures 3, 4:
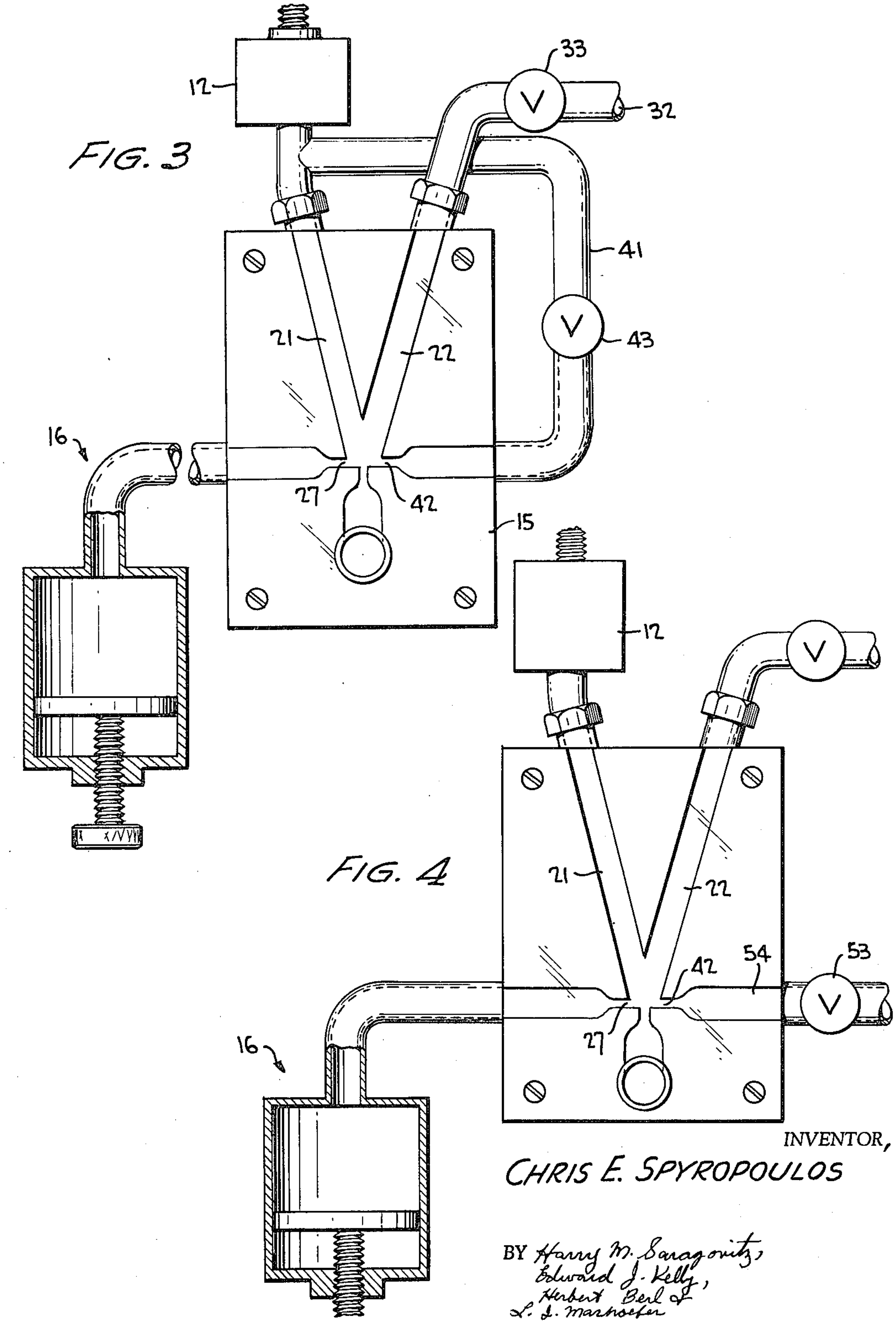
FIG. 3 is a plan view of a preferred specific embodiment of this invention.
FIG. 4 is a plan view of another embodiment of this invention.

FIG. 3 shows a preferred embodiment of the fluid relaxation oscillator of this invention. The embodiment of FIG. 3 is in most respects identical in construction and operation to that shown and described in connection with FIG. 1, and like reference numbers have been used to identify like parts. The modification incorporated in the embodiment of FIG. 3 is a feedback path 41 from the load channel 21, to a tuning orifice 42, which is located in the interaction region substantially opposite the pressure differential control orifice 27. A tuning valve 43 is provided in the feedback path 41.

The primary function of the feedback path 41 is to provide an additional tuning means for the oscillator. By adjusting the valve 43, a controlled amount of pressure from load channel 21 may be fed back on the side of the stream opposed to differential pressure control means 27. This has the effect of delaying the time when the power jet will switch out of the load channel 21 into the vent channel 22, since switching of the power jet is controlled by the differential pressure across the jet. Raising the pressure on the right side of the jet, when the jet is in the load channel 21, necessitates a higher pressure at differential pressure control orifice 27 to cause switching.

An alternate embodiment, similar to that shown and described in connection with FIG. 3, is shown in FIG. 4, like reference numbers again have been used for like parts. In this embodiment a tuning orifice 42 is connected to ambient pressure through a tuning valve 53 and conduit 54. This combination operates substantially in the same manner as the feedback path 41 and valve 43; namely, to permit additional tuning of the relaxation oscillator. Here, as was the case with the embodiment of FIG. 3, the venting conduit 54 allows some adjustment of the pressure on the right hand side of the power jet, thereby adjusting the pressure at which differential control orifice 27 switches the power jet.

It will be apparent that the embodiments shown are only exemplary and that various modifications can be made in construction and arrangement within the scope of the invention as defined in the appended claims.

I claim as my invention:

1. A pure fluid relaxation oscillator for producing a generally square wave output when operating into a substantially blocked load comprising:

(a) a boundary layer control fluid amplifier having
  (1) a power jet nozzle for issuing a power stream,
  (2) an interaction region having a load channel sidewall and a vent channel sidewall,
  (3) a load channel connected to said load,
  (4) a vent channel open to the ambient pressure, and
  (5) a splitter separating said channels, (b) relaxation control means operatively connected to said region for controlling the frequency of oscillation of said amplifier by
  (1) controlling the time rate of increase in the pressure differential across said stream in said region to the amount necessary to switch said stream from said load channel into said vent channel,
  (2) causing a decrease in said pressure differential across said stream in said region to the amount necessary to switch said stream from said vent channel into said load channel,
  (3) said control means controlling the time rate of said decrease in the pressure differential, (c) said relaxation control means including
  (1) a fluid resistance, and
  (2) a fluid capacitance connected to said resistance,
  (3) the time constant of said resistance and capacitance combination determining said time rates, and (d) means for tuning said oscillator comprising means for varying the pressure differentials necessary for the switching of said stream.

2. The pure fluid relaxation oscillator according to claim 1, wherein:

(a) said splitter is positioned close to said nozzle to increase the pressure recovery and to minimize the memory of said amplifier, (b) said fluid resistance comprises a laminar restriction with one end of said restriction forming an orifice in said load channel sidewall and the other end of said restriction being connected to said fluid capacitance, (c) said capacitance having means for varying its value, and (d) said tuning means including valve means in said vent channel for varying the pressure in said vent channel.

3. The pure fluid relaxation oscillator according to claim 2, wherein:

(a) said tuning means further includes a feedback path from said load channel to an orifice in said vent channel sidewall, (b) said path being provided with valve means for varying the pressure on the vent channel side of said stream.

4. The pure fluid relaxation oscillator according to claim 2, wherein:

(a) said tuning means further includes a venting conduit connected at one end to an orifice in said vent channel sidewall and being open to the ambient pressure at its other end, (b) said conduit being provided with valve means for varying the pressure on the vent channel side of said stream.

References Cited by the Examiner

UNITED STATES PATENTS

| | | | |
|---|---|---|---|
| 3,001,539 | 9/1961 | Hurvitz | 137—81.5 |
| 3,144,309 | 8/1964 | Sparrow | 137—81.5 |
| 3,153,934 | 10/1964 | Reilly | 137—81.5 |

M. CARY NELSON, *Primary Examiner.*

LAVERNE D. GEIGER, *Examiner.*